Figure 4:
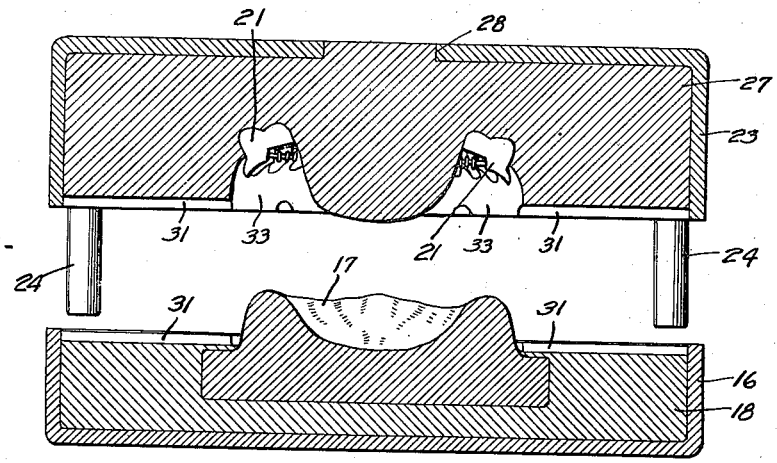

Sept. 16, 1941.   P. W. LEE   2,256,344
PROCESS OF MANUFACTURING NONSHATTERABLE VITREOUS DENTURE BASES
Filed Dec. 23, 1938   4 Sheets-Sheet 1
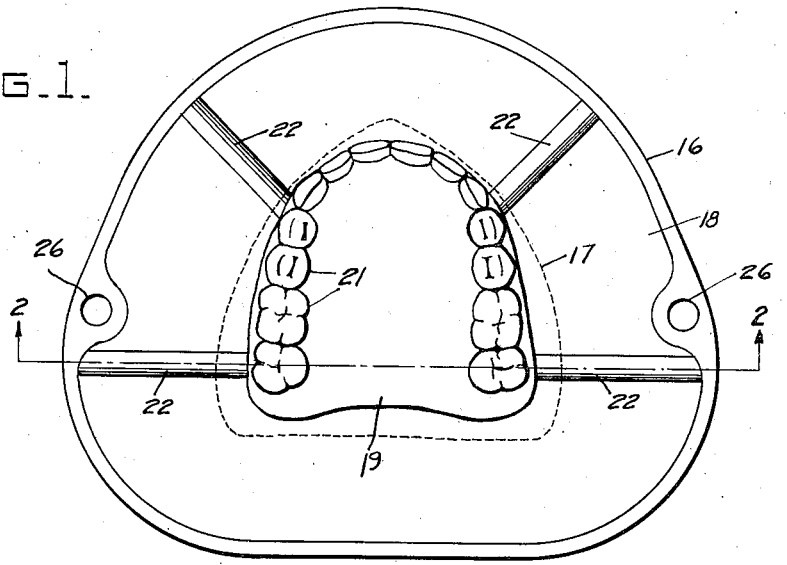
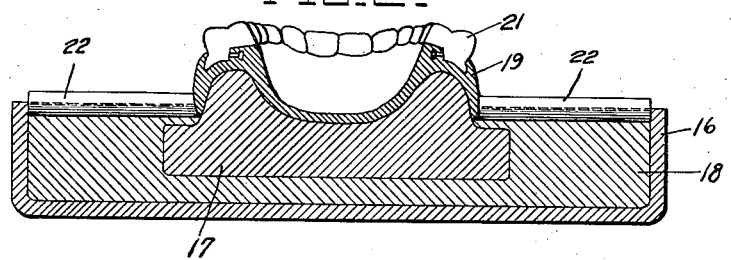
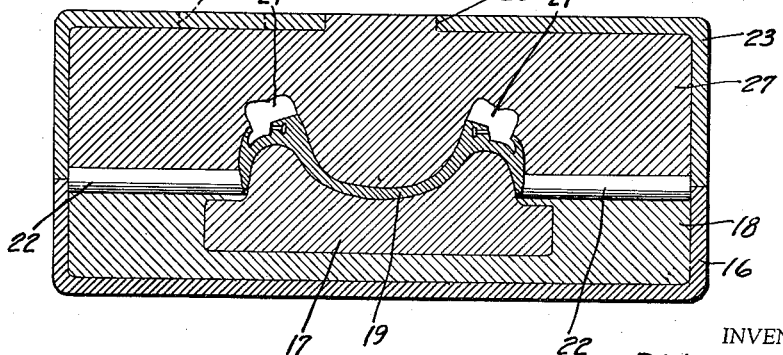
INVENTOR.
P. WILLIAM LEE
BY
ATTORNEY.

Sept. 16, 1941.  P. W. LEE  2,256,344
PROCESS OF MANUFACTURING NONSHATTERABLE VITREOUS DENTURE BASES
Filed Dec. 23, 1938  4 Sheets-Sheet 2

INVENTOR.
P. WILLIAM LEE
BY
ATTORNEY.

Sept. 16, 1941.   P. W. LEE   2,256,344
PROCESS OF MANUFACTURING NONSHATTERABLE VITREOUS DENTURE BASES
Filed Dec. 23, 1938   4 Sheets-Sheet 3

INVENTOR.
P. WILLIAM LEE
BY
ATTORNEY

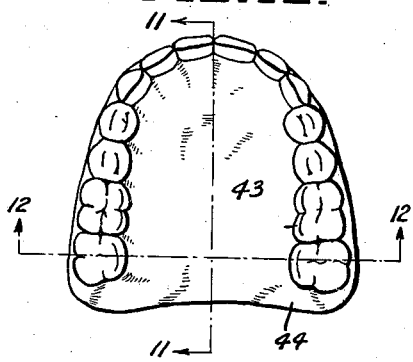
Fig. 10.
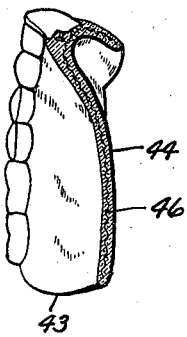
Fig. 11.
Fig. 13.
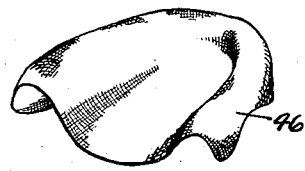
Fig. 12.
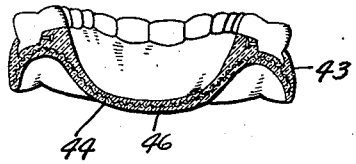
Fig. 14.
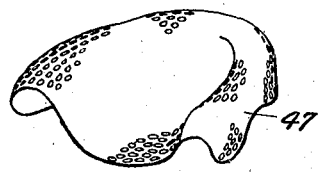

Patented Sept. 16, 1941

2,256,344

UNITED STATES PATENT OFFICE 2,256,344

PROCESS OF MANUFACTURING NONSHATTERABLE VITREOUS DENTURE BASES

Pyungtoo William Lee, York, Pa., assignor to The Dentists' Supply Company of New York, New York, N. Y., a corporation of New York Application December 23, 1938, Serial No. 247,482

3 Claims. (Cl. 18—55.1)

This invention relates to the manufacture of vitreous denture bases, and particularly to bases having reinforcing and non-shatterable elements therein. It is a well-known fact that vulcanized denture bases, by reason of their porosity, absorb acids and the like from the mouth of the edentulous, and that from that standpoint they are unsanitary. Even though the denture itself is washed and cleansed several times daily only the surface accumulation is removed, while the impurities which infiltrate the denture base itself remain there, and in many cases, become odoriferous and decidedly unsanitary.

It has been assumed by the dental profession at large that a denture base which would be non-pervious to the secretions of the oral cavity would be highly desirable, and some research and experimental work has been conducted along this line. However, denture bases of the type just referred to are readily frangible, and quite shatterable, and this is particularly true if the same incorporate latent defects, such as referred to in my co-pending application Serial No. 247,481, executed on November 28, 1938, and filed on even date herewith.

The object of the present invention is to provide a denture base substantially impervious to the secretions of the oral cavity.

A further object of the invention is to provide such a base with means to reinforce the same against breakage, and to provide against shattering in case the same does become broken.

A still further object of the invention is to provide an improved process for the manufacture of a reinforced non-shatterable denture base.

According to the invention, the denture base is formed of vitreous material, and has a stabilizing member embedded therein. This stabilizing member both reinforces and prevents the shattering of the denture base. The vitreous material denture base is manufactured by first investing a temporary base with teeth attached, then removing said base while allowing the teeth to remain in the investment material, then investing in the resulting cavity a filler consisting of vitreous forming material having a non-frangible stabilizing member embedded therein, and then firing said investment to vitrify said base filler.

Figure 5:
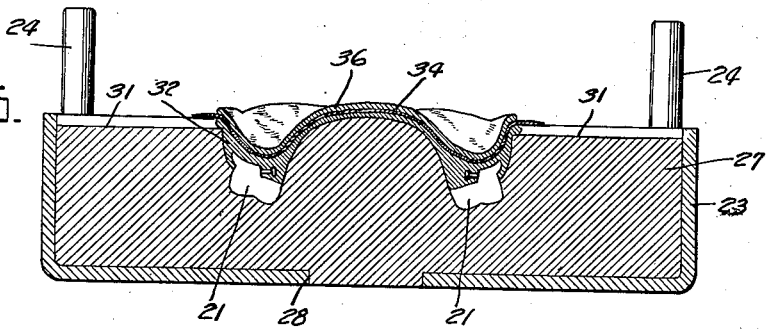
Figure 6:
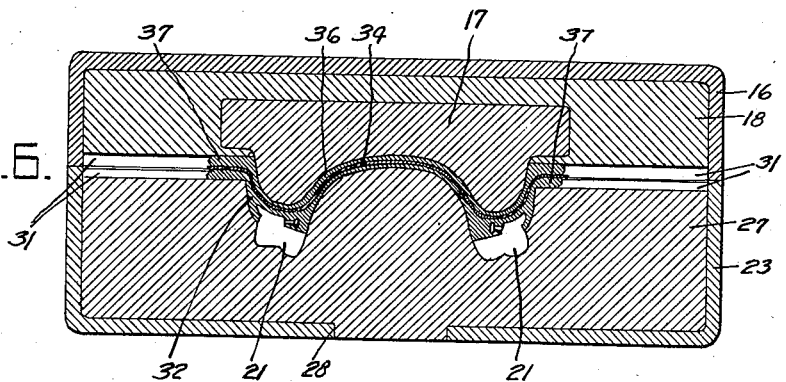
Figure 7:
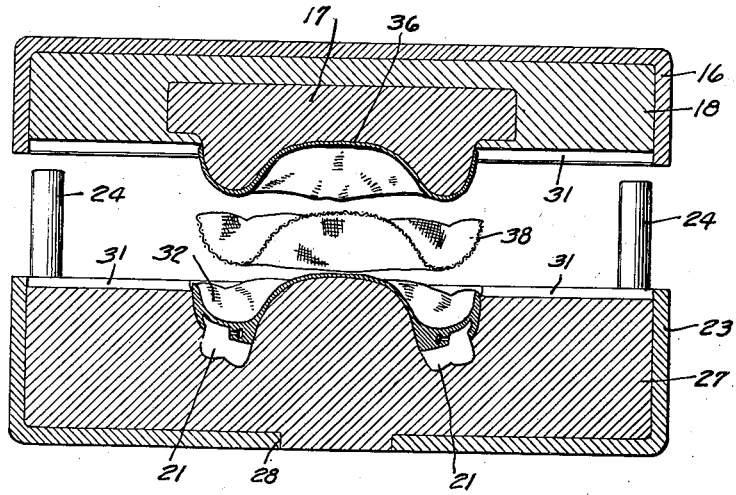
Figure 8:
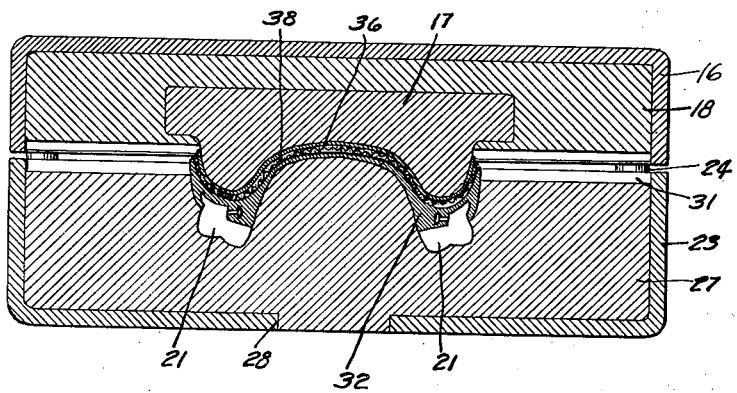
Figure 9:
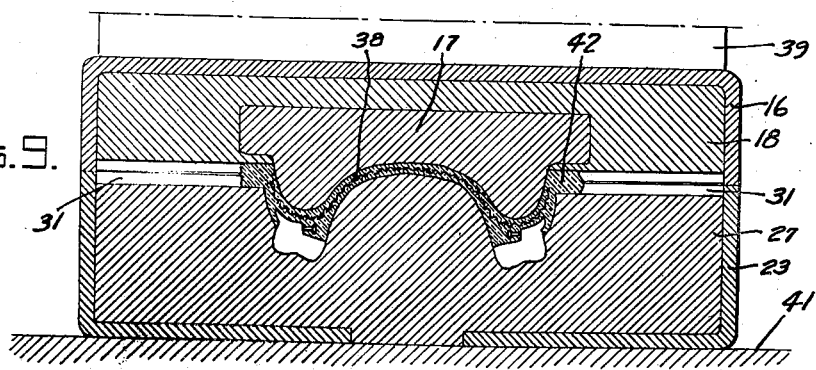

The drawings illustrate an embodiment of the invention, and the views therein are as follows:

Figure 1 is a top plan view of one part of an investment flask showing a temporary base with teeth attached invested therein, Figure 2 is a cross-sectional view of the same taken on the line 2—2 of Figure 1, Figure 3 is a view similar to Figure 2 and shows the other part of the flask applied thereto, and filled with investment material, Figure 4 shows the flask separated and the temporary denture base material removed therefrom, Figure 5 shows that part of the flask containing the teeth inverted, and with the vitreous denture base forming material placed therein and with a sheet of glazed material separating the same into two parts, Figure 6 shows the application of the other half of the flask to the part shown in Figure 5 and with the duplicate mould pressed onto the vitreous denture base forming material, Figure 7 shows the flask parts separated, the glazed sheet removed, and a pre-formed stabilizing member about to be inserted between the two parts of the vitreous denture base forming material, Figure 8 shows the flask parts united and slightly separated by the vitreous denture base material, Figure 9 is a like view after the flask has been placed under pressure, Figure 10 is a bottom plan view of a complete denture, Figure 11 is a vertical sectional view taken on the line 11—11 of Figure 10, Figure 12 is a cross-sectional view taken on the line 12—12 of Figure 10, Figure 13 is a perspective view of a wire gauze stabilizing element, such as shown in Figures 11 and 12, and Figure 14 is a perspective view of a perforated stabilizing member.

As illustrated in the drawings, and particularly in Figure 1, one-half 16 of an investment flask has a duplicate model 17 invested in the investment material 18 therein. On this duplicate model is placed a temporary base 19 with teeth 21 attached. When the investment material 18 is poured into the flask section 16 in plastic form, wax rods 22 are suitably located for the purpose later explained.

In Figure 3, the other section 23 of the investment flask has been joined with the section 16, and these sections fit squarely together by virtue of the pins 24 (see Figures 4 and 5) fitting into the holes 26 (see Figure 1). Figure 3 shows the vertical edges of the two flasks aligned and adjacent, and with the section 23 of the flask filled with the investment material 27 which may be poured into the same through the opening 28, a vent hole 29 being provided. At this point, the flask is allowed to stand idle until the investment materials have set.

The sections 16 and 23 of the flask are then separated as shown in Figure 4, and the temporary denture base material removed. If the temporary base was made of wax, the wax can readily be washed out with the use of boiling water, and will leave the teeth fixed in the investment material 27 in the part 23 of the flask. The use of the boiling water has also washed out the wax rods 22, leaving complementary spillways or excess channels 31 in the investment material 18 and 27 in the two parts of the flask.

Figure 5 shows the flask part 23 inverted, and shows a layer 32 of vitreous base forming material pressed into the cavity 33 (see Figure 4) so as to fill up around the gingival ends of the artificial teeth in the investment material. Onto this layer of material 32, there is placed a thin glazed sheet 34 of material which will not adhere to the vitreous denture base forming material while another layer of said base forming material 36 is placed on said glazed sheet, as shown in Figure 5. This glazed sheet should be of very thin flexible material, such for instance as Cellophane.

The flask part 16 with the duplicate model 17 invested in the investment material 18 is now united with the part 23 of the flask and pressure is applied so as to bring the vertical walls of the flask parts into contact within the desired limit. This action forces the excess vitreous denture base forming material 37 into the spill-ways or excess channels 31, while the combined vitreous denture base forming material and glazed sheet 34 will, with the exception of the excess material 37, form the same pattern as the temporary base 19 of Figures 2 and 3 except its thickness.

At this point, the flask parts 16 and 23 are again separated and the glazed sheet 34 removed, one layer of the vitreous denture base forming material remaining in the part 16 of the flask and the other part remaining in the part 23 of the flask, as shown in Figure 7. The excess material 37 is then removed from the spill-ways or excess channels 31 so as to leave the base forming material, as shown in Figure 7.

Previous to the commencement of this operation there has been pre-formed on the duplicate model 17 a stabilizing member 38. This stabilizing member, therefore, is of substantially the same shape as the opposed faces of the vitreous denture base forming material in the respective parts of the flask (see Figure 7). This stabilizing member 38 may be then placed between the opposed surfaces of the vitreous denture base forming material and the flask parts united, as shown in Figure 8. By virtue of the greater thickness of this stabilizing member over the thickness of the thin glazed sheet and also the thickness of the two layers of vitreous base forming material made purposely to a certain thickness to take care of shrinkage upon firing, the vertical walls of the flask parts will be slightly separated. Now the entire flask is placed under pressure in a moulding furnace where the temperature is brought up to the proper degree for vitrifying the material which forms the denture base.

In Figure 10 there is shown a denture 43 having a base 44 formed of vitrified material and having therein a wire gauze stabilizing member 46. This stabilizing member is shown in perspective in Figure 13, and, as before stated, may be shaped and cut to form prior to its insertion between the layers of the vitreous denture base forming material adhering to the material in the respective flask parts.

Figure 14 shows a perforated stabilizing plate 47 which may be of thin flexible metal cut and formed to shape in the same manner as the wire gauze stabilizing member 46.

In carrying out the present invention, I have with good success made the vitreous denture base forming material into plastic condition and gently moulded the respective layers into the cavity formerly occupied by the temporary denture base material, but it is, of course, apparent that this material may be in granular or other form so long as it will fire and keep the dimensions of the temporary denture base.

Defects, and particularly latent defects, in the finished vitreous denture bases may be avoided by pre-firing some or all of the ingredients used in making up the vitreous denture forming material in accordance with my invention forming the subject-matter of my co-pending patent application hereinbefore referred to.

Of course, the vitreous denture forming base illustrated and described, as well as the process for manufacturing the same, may be changed in various ways without departing from the invention herein set forth and hereafter claimed.

The invention is hereby claimed as follows:

1. The process of manufacturing a non-shatterable vitreous denture base in a flask, comprising the steps of first investing the denture model with an investment material in one-half of the flask, the denture model having thereon a temporary denture base with teeth attached, then applying the other half of said flask and filling same with investment material, then opening the flask, then removing the temporary denture base material while allowing the teeth to remain in the set investment material, then moulding a layer of plastic vitreous forming material into said resulting cavity, then inserting a flexible sheet of glazed material, and conforming same to shape of vitreous forming material, then moulding another layer of plastic vitreous forming material onto said flexible member, then closing said flask and applying pressure, then opening said flask, removing said flexible glazed sheet and inserting a preformed non-frangible member, then closing said flask and applying pressure, and then firing said investment to vitrify said plastic sheets with the included non-frangible member.

2. The process of manufacturing a non-shatterable vitreous denture base in a flask, comprising the steps of first investing the denture model with an investment material in one-half of the flask, the denture model having thereon a temporary denture base with teeth attached, then applying the other half of said flask and filling same with investment material, then opening the flask, then removing the temporary denture base material while allowing the teeth to remain in the set investment material, then moulding a layer of plastic vitreous forming material into said resulting cavity, then inserting a flexible sheet of glazed material, and conforming same to shape of vitreous forming material, then moulding another layer of plastic vitreous forming material onto said flexible member, then closing said flask and applying pressure, then opening said flask, removing said flexible glazed sheet and inserting a preformed non-frangible member, the areas of said base and member being co-extensive, then closing said flask and applying pressure, and then firing said investment to vitrify said plastic sheets with the included non-frangible member.

3. The process of manufacturing a non-shatterable vitreous denture base in a flask, comprising the steps of first investing the denture model with an investment material in one-half of the flask, the denture model having thereon a temporary denture base with teeth attached, then applying the other half of said flask and filling same with investment material, then opening the flask, then removing the temporary denture base material while allowing the teeth to remain in the set investment material, then moulding a layer of plastic vitreous forming material into said resulting cavity, then inserting a flexible sheet of glazed material, and conforming same to shape of vitreous forming material, then moulding another layer of plastic vitreous forming material onto said flexible member, then closing said flask and applying pressure, then opening said flask, removing said flexible glazed sheet and inserting a preformed wire gauze stabilizing member, then closing said flask and applying pressure, and then firing said investment to vitrify said plastic sheets with the included wire gauze.

P. WILLIAM LEE.